Figure 1:
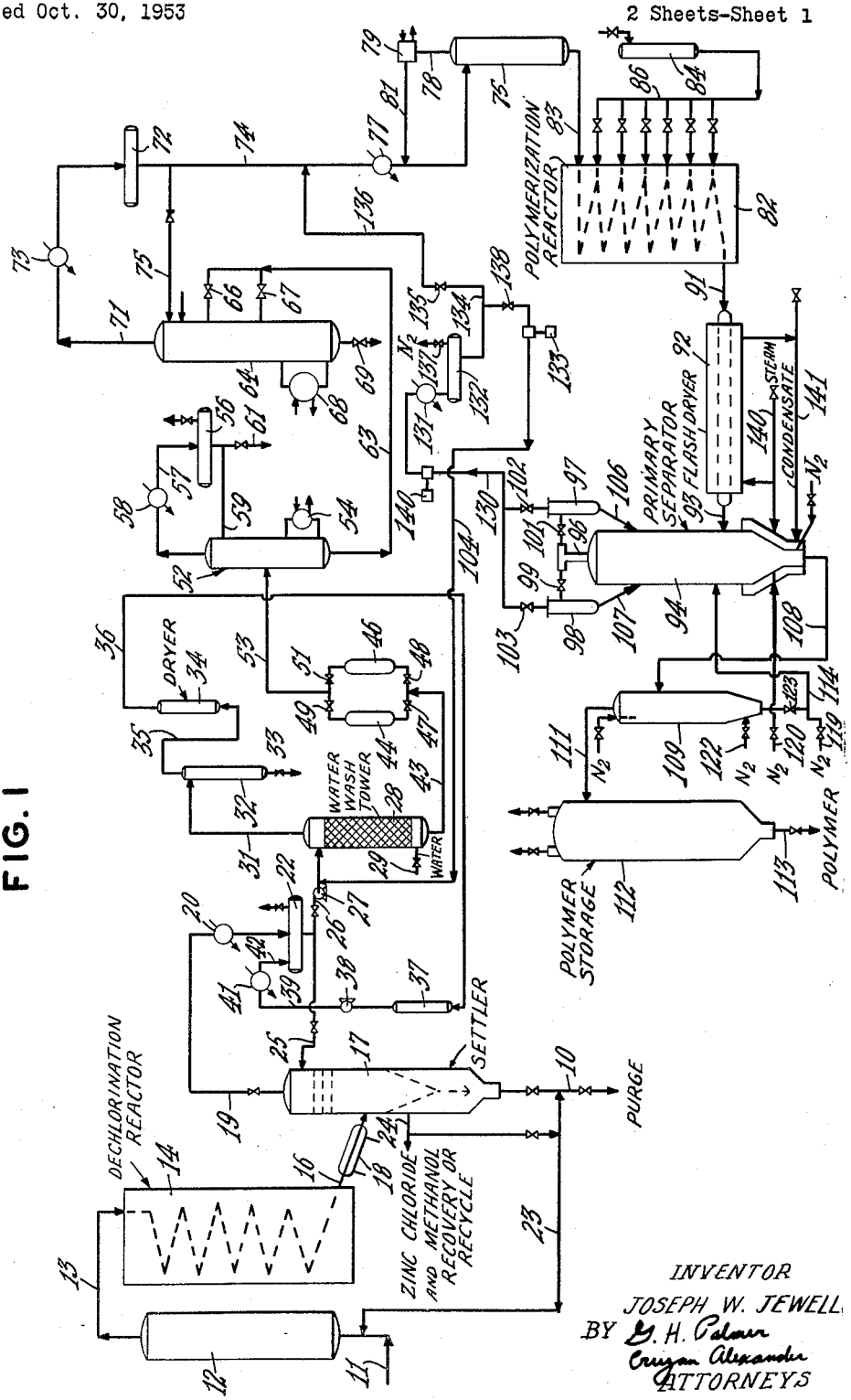

Dec. 19, 1961  J. W. JEWELL  3,014,015
PRODUCTION OF PERFLUOROCHLOROOLEFIN POLYMERS
Filed Oct. 30, 1953  2 Sheets-Sheet 1

INVENTOR
JOSEPH W. JEWELL
BY G. H. Palmer
Cruzan Alexander
ATTORNEYS

Dec. 19, 1961 J. W. JEWELL 3,014,015
PRODUCTION OF PERFLUOROCHLOROOLEFIN POLYMERS
Filed Oct. 30, 1953 2 Sheets-Sheet 2

INVENTOR
JOSEPH W. JEWELL
BY G. H. Palmer
Cruzan Alexander
ATTORNEYS

United States Patent Office 3,014,015
Patented Dec. 19, 1961

3,014,015
PRODUCTION OF PERFLUOROCHLORO-
OLEFIN POLYMERS
Joseph Warren Jewell, Summit, N.J., assignor, by mesne
assignments, to Minnesota Mining and Manufacturing
Company, St. Paul, Minn., a corporation of Delaware
Filed Oct. 30, 1953, Ser. No. 389,206
12 Claims. (Cl. 260—92.1)

This invention relates to a process for the manufacture of normally solid thermoplastic perfluorochloroolefin polymers. In another aspect, this invention relates to a continuous process for the production of solid polymers of trifluorochloroethylene from trifluorotrichloroethane.

Prior to the process of this invention polymerization of the perfluorochloroolefin polymers, such as trifluorochloroethylene, was effected by a mass-bulk or bomb type of reaction. In the prior type of reaction, monomer was introduced into the bomb together with a sufficient quantity of promoter and the bomb and contents were maintained at a temperature of about −17° C. for about 7 days after which the reaction was complete. The bomb was then heated at reduced pressure to distill off unreacted monomer. Polymer was removed from the bomb in the form of a porous-plug which was subsequently pulverized and prepared for shipment.

While the bomb-type of polymerization results in high yields of polymer based on monomer charged, and while the quality of the produced polymer is exceptionally high, certain disadvantages are inherent in the process. Thus, the maximum diameter which may be used is about 6 inches because of the poor heat transfer through the mass to the wall. Even in a 6 inch diameter reactor the temperature differential between the outside of the bomb and the center is about 30° C. Because of the limited size of these reactors, accompanying labor charges are high.

To overcome the disadvantages of the mass-bulk type of polymerization, continuous processes have been developed. For example, in a typical continuous process for the production of polytrifluorochloroethylene, trifluorotrichloroethane is dehalogenated in an auto-clave type reactor to produce trifluorochloroethylene which is then passed through a series of purification steps. The purified trifluorochloroethylene is then introduced into an auto-clave type polymerization reactor together with a quantity of promoter. The polymer is formed as a suspension or slurry in the monomer. This monomer-polymer slurry is then separated by filtration or centrifugation. The monomer is recycled, and the polymer is stored for further processing.

While present continuous polymerization processes have, to a large extent, overcome the disadvantages of the mass-bulk type process, there are still certain inherent disadvantages. When polymer is produced as a suspension in monomer it forms a difficultly separable mixture. Separation of the polymer from the monomer by filtration is a slow and tedious process while separation by centrifugation techniques requires the use of costly equipment. Present continuous processes are also deficient, in that the starting materials are dehalogenated and the polymerization is effected in auto-clave type reactors. Each of these steps, is highly susceptible to the effects of temperature variation therein. Thus, in the dehalogenation step, when temperature is not adequately controlled side reactions occur resulting in the production of undesirable by-products with a consequent greater liability to contamination of the monomer and to the quality of the polymer product. In the polymerization reaction, poor temperature control results in the production of a polymer having an indeterminate N.S.T. and a wide molecular weight distribution. One of the principal objects of this invention is to overcome the disadvantages discussed above.

It is another object of this invention to provide a process for efficiently separating polymer from a monomer-polymer slurry or suspension.

It is another object of this invention, to provide a continuous process for the production of perfluorochloroolefin polymers, such as trifluorochloroethylene of controlled quality from perfluorochloroparaffinic starting materials such as trifluorotrichloroethane.

It is another object of this invention, to provide a continuous process for the production of polymers of trifluorochloroethylene wherein adequate time temperature control may be effected.

Another object of this invention, is to provide an improved method for producing monomer.

Another object of this invention is to provide an improved method for polymerizing monomer by controlling the concentration of reactants. A still further object of this invention is to provide an integrated continuous process for the production of monomer, the polymerization of the monomer to produce solid polymer of controlled quality and the recovery of the unreacted monomer from solid polymer product.

A further object of this invention is to provide a process for large capacity continuous production of normally solid perfluorochloroolefin polymers of above 220° C. N.S.T.

Another object of this invention is to reduce production costs by providing a continuous polymerization process.

Various other objects and advantages of the present invention will be apparent to those skilled in the art from the accompanying description and disclosure.

In general, the above objects are accomplished, and the above described disadvantages overcome by effecting temperature sensitive reactions under controlled conditions in angularly disposed elongated tubular reactors having a high surface to volume ratio. Separation of produced polymer from monomer is effected by passing the monomer-polymer slurry into an elongated tubular drying zone, wherein heat is applied, thereby vaporizing the monomer and leaving the solid polymer as a dispersed powder in the monomer vapor.

This invention is applicable to the polymerization of perfluorochloroolefins such as trifluorochloroethylene, difluoro-dichloroethylene and 2,3 dichloroperfluoro butene ($CF_3CClCClCF_3$) and in addition, to the copolymerization of perfluorochloroolefins with other fluorine-containing olefins such as perfluorobutadiene, vinylidene fluoride, difluoroethylene, trifluoroethylene, perfluorostyrene, perfluorocyclobutene, and phenyltrifluoroethylene. The perfluorochloroolefins to which this invention is applicable, are perhaloolefins with any degree of unsaturation consisting of fluorine from two to four carbon atoms and at least one chlorine atom per molecule. The perfluorochloroparaffinic starting materials are perhaloparaffins consisting of fluorine, from two to four carbon atoms and at least three chlorine atoms per molecule and at least one chlorine atom on each of two adjacent carbon atoms. The conditions of polymerization of the copolymers of the perfluorochloroolefins are substantially the same as for the homopolymer. The following discussion of the general application of the present invention to polymers of trifluorochloroethylene applies substantially to all polymerization systems with the perfluorochloroolefins. The term "polymer" includes homopolymers and copolymers; the term "polymerization" includes homopolymerization and copolymerization.

Figure 2:
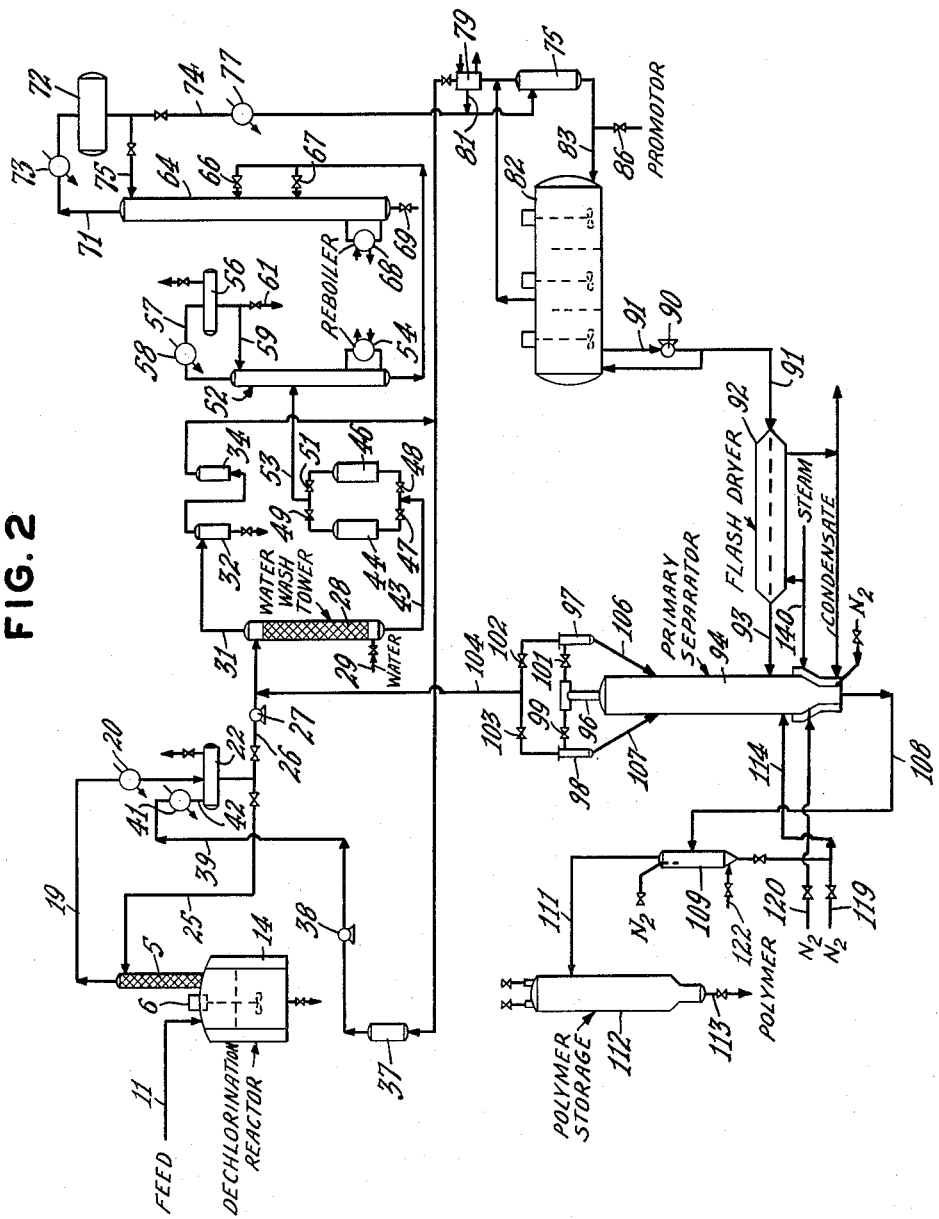

In order to more clearly illustrate the process of the present invention reference will be made to FIGURES 1 and 2 of the drawing which diagrammatically illustrate a suitable arrangement of apparatus in elevation which is used for the production of normally solid thermoplastic polymers of trifluorochloroethylene. The principal pieces of equipment for effecting the process of this invention are shown in FIGURE 1 of the drawing. They are dechlorination reactor 14, settler 17, polymerization reactor 82, and flash dryer 92. The adaptation of the use of the flash drying apparatus in an auto-clave type process is shown in FIGURE 2 of the drawing. The process will be described in the drawing for the polymerization of trifluorochloroethylene to produce the homopolymer thereof.

According to FIGURE 1 of the drawing and the process illustrated, trifluorotrichloroethane, commercially available as Freon 113, is passed through conduit 11 into preheater 12. A slurry of metallic zinc in methanol is simultaneously introduced into preheater 12 through conduit 11 by means not shown. Although zinc is a preferred dechlorinating agent other metals may be used such as tin, manganese, magnesium and iron without departing from the scope of this invention. Methyl alcohol is a preferred solvent although other suitable solvents, such as ethanol, butanol, propanol, glycerol, dioxane and the cellosolves may be used. The function of preheater 12 is to mix the reactants and to bring them to reaction temperature so as to initiate the reaction; preheater 12 is maintained at a temperature between about 75° C. and about 250° C., preferably between about 90° C. and about 180° C. In a preferred method of operation the reactants pass from preheater 12, which is maintained at a temperature of at least about 10° C. above the temperature of the dechlorination reactor preferably about 30° C. above the temperature of the dechlorination reactor through conduit 13 into dechlorination reactor 14 where the dechlorination is effected with accurate temperature control. Dechlorination reactor 14 consists of either a jacketed pipe or a spiral coil in a bath with a fairly steep down flow pitch throughout its length. The steep downflow pitch is necessary to maintain the metallic dehalogenating agent, which has quite a high settling rate, in suspension. From the horizontal, the angle of the reactor is maintained at about a minimum of 5° to a maximum of about 90°. Preferably, the angle is maintained between about 20° and about 60° from the horizontal. Velocity of the reactants through the reactor is maintained between about 0.5 and about 10 feet per second preferably between about 2 feet and about 6 feet per second. At a velocity less than about 0.5 foot per second the zinc settles and the reaction cannot be properly controlled. Both the time and temperature control in this reactor are exceptionally good particularly when the reactor is used in its preferred form, that is as a sectionally jacketed pipe, since a sectional construction permits a change in the degree of cooling for each section. Reaction temperature is maintained within a desired range between about 0° C. and about 200° C. with pressure controlled as desired so as to maintain liquid phase between about atmospheric and about 300 pounds per square inch gage. Preferred temperature is between about 40° C. and about 175° C. with a particularly suitable temperature of between about 50° C. and about 150° C. Residence time in the reactor is between about 3 seconds and about 4 minutes. Produced monomer, zinc chloride, methanol and any other products of the reaction are removed from reactor 14 through conduit 16 to settler 17. Heat exchanger 18 is located on conduit 16 to regulate the temperature of the stream into the settler. Temperature in the settler is adjusted i.e. between about 75° and about 130° C. preferably between about 90° C. and about 120° C. so that monomer will pass overhead through conduit 19 to cooler 20 where it is condensed and accumulated in accumulator 22. The unreacted zinc concentrate suspended in methanol and containing zinc chloride is collected at the bottom of settler 17 and may be recycled through conduit 23 to preheater 12. Complete elimination of monomer from this stream while desirable, is not essential, a small fraction of this stream may be withdrawn through line 10 to control the concentration of heavy impurities; zinc so withdrawn may be recovered. Zinc chloride and methanol are removed through conduit 24 where they may be recovered or recycled. A portion of the monomer contained in accumulator 22 is recycled through conduit 25 as to control the quality of the product.

The monomer contained in accumulator 22 is contaminated with small quantities of methanol and other impurities from the dechlorination zone, such as trifluoroethylene, difluorovinyl chloride, etc. In order to remove these impurities, the monomer is passed through conduit 26 by means of pump 27 into the top of water-wash tower 28. In the water-wash tower, the monomer flows downward through an upward moving stream of water which scrubs the monomer free of water-soluble impurities such as alcohol. Water containing methanol and a small amount of monomer is removed from the top of the water-wash tower through conduit 31 and is passed into the top portion of separator 32. Water and methyl alcohol are removed from the bottom of separator 32 through conduit 33 and may be either discarded or circulated to an alcohol recovery system.

Monomer containing water is passed to dryer 34 through conduit 35. Dryer 34 contains a conventional drying agent, such as calcium sulfate. The dried monomer is then recycled through conduit 36 to absorber 37 then to compressor 38 where it is compressed and passed through conduit 39 through cooler 41 into accumulator 22 through conduit 42. Absorber 37 serves to remove corrosive materials which might damage compressor 38. The water-washed monomer, free of water-soluble impurities is removed from the bottom of tower 28 through conduit 43 to dryers 44 and 46. Dryers 44 and 46 contain a conventional drying agent such as calcium sulfate. Valves 47, 48, 49 and 51 are used to close down either of the dryers for cleaning purposes.

The dry monomer containing low and high boiling impurities from the dechlorination zone is passed to distillation column 52 through conduit 53. The temperature of distillation column 52 is maintained at about 50° C. by means of reboiler 54 so that low boiling impurities are removed overhead in vapor phase. The low boiling impurities which are removed overhead as vapor are passed through conduit 57 to accumulator 56. Cooler 58 is a conventional cooler. A portion of the low boiling impurities is recycled to the top of distillation column 52 through conduit 59 as reflux. The low boiling impurities may be recovered for other use or discarded as liquid through conduit 61 or as vapor through valve 62 which valve is used to control the pressure in the system.

The monomer free of low boiling impurities is removed as a liquid from the bottom of distillation column 52 through conduit 63 and is passed to the center portion of distillation column 64. The monomer is introduced into column 64 by means of valves 66 and 67. The temperature in distillation column 64 is so adjusted as to remove monomer as a vaporous fraction overhead leaving the high boiling impurities such as difluorovinyl chloride as a bottoms product. Temperature control is effected by reboiler 68 which is maintained at about 52° C. The high boiling impurities are removed from column 64 as a bottoms product through conduit 69 and may be either recovered or discarded. Substantially pure monomer is removed as a vapor from the top of column 64 through conduit 71 and is collected in accumulator 72. Cooler 73 is a conventional cooler and is used to condense vaporized monomer. A portion of the pure monomer contained in accumulator 72 is recycled through conduit 73 to the top of column 64 as reflux.

Purified monomer is passed from accumulator 72 through conduit 74 to accumulator 75 where it is held prior to introduction into the polymerization zone. Exchanger 77 is a conventional unit which is used to bring the monomer to proper temperature for the desired pressure in accumulator 75. In order to maintain this equilibrium vaporized monomer leaves accumulator 75 through conduit 78 and enters condenser 79 where it is condensed and recycled through conduit 81. Condenser 79 and connecting lines maintain monomer in accumulator 75 under its vapor pressure at the operating temperature. Monomer is withdrawn as required from accumulator 75 and is introduced into polymerization reactor 82 through conduit 83. Polymerization reactor 82 consists of a series of coils situated in an annular tank containing any suitable liquid for the purpose of temperature control. A refrigeration coil not shown in the diagram is used to maintain the desired temperature of the liquid in which the coil is immersed and forced circulation of this liquid is used to assure uniform temperature and predictable transfer rates. A suitable promoter such as trichloroacetyl peroxide is introduced into the reactor from promoter storage tank 84 through conduit 86. Other organic peroxide promoters may be used such as benzoyl peroxide, trifluoroacetyl peroxide, difluorochloroacetyl peroxide, chloroacetyl peroxide and dichlorofluoroacetyl peroxide. The halogenated acyl peroxides are preferred. The promoter is introduced at at least one point preferably a plurality of points along the length of the reaction coil. The continuous injection of promoter at a plurality of points in a small cross section flowing stream gives a much better assurance that all the monomer has an immediate opportunity to contact the promoter than is possible when the promoter is injected into a large volume of monomer in an auto-clave. This procedure provides an added method of controlling the quality, that is the molecular weight distribution of the produced polymer since promoter concentration affects the quality of the polymer. Obviously, this type of control is not possible in an auto-clave type reactor. From the horizontal, the angle of the reactor coils is maintained between a minimum of about 1° and a maximum of about 30°, preferably between about 5° and about 15°. The velocity of the reactants passing through the coil is between about 0.1 foot and about 10 feet per second with a particularly suitable velocity of between about 0.1 foot and about 5 feet per second, and a preferred velocity between about 0.3 foot and about 4 feet per second. Temperature in the polymerization zone is maintained between about −20° C. and about 150° C. depending on the promoter employed and the dimension of the polymerization zone and the velocity of the reactants. Preferred temperature is between about 10° C. and about 75° C. Generally higher temperatures are employed when the reactants are moved at high velocities through reaction zones of short length.

While approximately 25% of the monomer may be converted to polymer within the polymerization reactor, it is preferred to keep the concentration of polymer suspended in monomer, between about 3 and about 12%. The monomer stream containing suspended particles of polymer is passed from polymerization reactor 82 through conduit 91 to flash dryer 92. Flash dryer 92 consists of an elongated tubular heater contained in a jacket through which by means of lines 140 and 141, a heating medium such as steam is circulated so as to maintain a temperature between about 60° C. and about 250° C. preferably between about 80° C. and about 120° C. The slurry of polymer in liquid monomer is admitted to the dryer through pressure reducing and control valve 91. With the reduction in pressure and application of heat the monomer is vaporized very rapidly. The consequent increase in volume results in a rapid increase in velocity which prevents accumulation of polymer on the heating surface. The relative increase in velocity is from 0.5–10 feet per second at the inlet to about 200 feet per second at the outlet. Conditions should be adjusted i.e. by using a higher temperature or a smaller pipe diameter so that the minimum outlet velocity is about 50 feet per second, preferably between about 100 and about 300 feet per second and still more preferably between 150 and 250 feet per second. When the outlet velocity is maintained at less than about 50 feet per second the polymer powder tends to accumulate on the heating surface and plug the line. The high turbulence under these conditions results in the rapid and uniform evaporation of substantially all of the monomer leaving a polymer powder dry enough to fluidize readily. The mixture is discharged through conduit 93, connected either radially or tangentially to primary separator 94.

The powder settles to the bottom of 94 which is heated sufficiently to maintain a temperature that will vaporize any residual monomer occluded or adsorbed in the polymer powder. A stream of aeration gas is introduced to the bottom of the vessel 94 through valve 120 on line 121 to maintain a fluid bed and to act as a stripping medium to remove vaporized monomer. The use of nitrogen for this purpose is shown although any other gas which is non-reactive in the system may be used.

In order to insure a powder particle size distribution that will fluidize readily and to prevent accumulation of polymer on the walls of the separator, a portion of finished polymer which has been extruded and reground to coarse particle size is introduced (means not shown) into the coarse polymer hopper 109. It flows from the hopper through bottom valve 123 into line 114 where it is picked up in a stream of nitrogen admitted to the line through valve 119 and is carried to a point in primary separator 94 such that it will thoroughly mix with the powder discharged from the flash dryer.

A portion of the polymer product is allowed to mix with the coarse powder in hopper 109 and is recycled to the primary hopper 94. This permits control of the rate of powder flow in the bottom of 94 and thus assists in the ability to maintain a good fluid condition. The net polymer product is elutriated from hopper 109 in a stream of nitrogen or other suitable gas introduced into the bottom part of hopper 109 through valve 122 in sufficient quantity to provide the required elutriating velocity in that vessel and discharged through line 111 to storage hopper 112.

Vaporized monomer passes overhead from separator 94 through line 96 to filters 97 and 98. Valves 99, 101, 102 and 103 are used to shut down either of the filters for cleaning or repair. Vaporized monomer free of polymer but containing nitrogen flows through line 130, compressor 140 and condenser 131 into accumulator 132. This accumulator is held under sufficient pressure, by nitrogen flow through valve 137, to flow through line 134, valve 135 and line 136 to line 74 and so back to the reactor feed accumulator. To control the concentration of contaminants in the recycle monomer a part of the recycle is bled off through valve 138 and is pumped by pump 133 to accumulator 22 for monomer purification. Primary separator 94 and polymer-hopper 109 are maintained under slight pressure with nitrogen gas. The nitrogen is removed from the equipment, is recovered and recycled by means not shown.

While the process of this invention has been described above and in FIGURE 1 of the drawing, in one of its preferred embodiments, it will be advantageous at times to incorporate some of the aspects of the invention in other processes. Thus, FIGURE 2 of the drawing illustrates the use of the flash dryer in an auto-clave type process. According to FIGURE 2 of the drawing trifluorotrichloroethane and methanol-zinc slurry are introduced into the dechlorination reactor through conduit 11. The reaction is initiated in the reactor by heating with steam. Once the reaction has started cooling liquid is circulated through coils positioned on the reactor to control temperature. Conventional stirrer 6 is used to circulate the reactants. The temperature in the reactor is adjusted so that monomer and entrained methanol pass overhead through dephlegmator 5 wherein a substantial portion of the methanol is condensed and returned to the reactor. Contaminated monomer is passed through conduit 19 to accumulator 22. Conventional cooler 20 condenses the vaporous monomer prior to its passage to the accumulator. The purification of the monomer contained in accumulator 22 is effected in a manner identical with that described in FIGURE 1 of the drawing. The various components employed in the purification process in FIGURE 2 of the drawing are numbered identically with the components of FIGURE 1 of the drawing. Reference may therefore, be made to FIGURE 1 of the drawing in order to follow the process described in FIGURE 2.

Prior to its introduction into the polymerization reactor, purified monomer is held in accumulator 75. The purified monomer is passed from the accumulator through conduit 83 to polymerization reactor 82. An organic peroxide preferably a halogenated acyl peroxide such as trichloroacetyl peroxide is introduced into the reaction zone through conduit 86. The polymerization reactor 82 illustrated in the drawing, is a preferred type of autoclave reactor that is, a three stage horizontal reactor. Other types of auto-clave reactors may be substituted for that shown in the drawing, such as a vertical single stage auto-clave. The use of such other auto-claves affords no advantage over the three stage type and has instead some disadvantages.

The polymer produced in reactor 82 forms as a particulate suspension in the monomer and is present in an amount not exceeding about 12% by weight and preferably about 6%. The monomer-polymer slurry is withdrawn from the end of the polymerization reactor and is passed through conduit 91 to a flash dryer. Conventional pump 90 is used to control the feed rate of the monomer-polymer slurry to the flash dryer. The separation of polymer from monomer by means of the flash dryer and its auxiliary equipment is described at length above in connection with the process of FIGURE 1 of the drawing. Reference numerals used on each of the figures are identical so that cross-referencing will be simplified.

The process of this invention has been described above in specified flow channels from feed to product. As was indicated in this description, the significant aspect of the invention resides in the use of elongated tubular reaction zones preferably angularly disposed in continuous downward flow. By means of this arrangement various temperature sensitive reactions are conducted with adequate mixing and opportunity for contact with heating or cooling surfaces so that optimum temperature control is attained.

With optimum temperature control the reaction may be conducted at higher average temperatures and higher conversion rates without getting the undesirable side reaction products which are unavoidable in stirred auto-clave type reactors due to local "time-temperature" pockets. A higher yield of more uniform quality polymer is, therefore, produced.

At the same time the arrangement permits the use of velocities low enough so that pressure drop, in the elongated path necessary to the required contact time, will not be excessive. The size of any particular reaction zone will be determined by the type of reaction, the desired conversion and the product capacity of the unit. Tube or pipe diameters lower than ¼ inch should be avoided because of the danger of stoppage due to build-up of solids while pipe diameters substantially in excess of 2 inches, generally do not enable satisfactory temperature control. For example, the dechlorination reactor may comprise a tube between about a 0.25 inch pipe and about 2 inches preferably between about 0.5 and about 1.25 inches in diameter. The length of the dechlorination reaction zone may be between about 30 feet and about 120 feet preferably between about 60 feet and about 100 feet. The polymerization reaction zone likewise is made of a pipe between about ¼ inch and about 2 inches in diameter preferably between about 0.5 and about 1.25 inches but of considerably longer length due to the nature of the reaction which occurs therein. Thus, the polymerization reactor for the described reaction is between about 5,000 feet and about 25,000 feet in length, preferably between about 10,000 feet and about 20,000 feet. Because of its length the polymerization reactor is preferably arranged in the form of a coil or helix. The coil is disposed so as to secure the necessary velocity of the reactants in the reaction zone. Generally, the coil is so arranged that the reactants move through it at a velocity preferably between about 0.5 feet and about 4 feet per second. The size of the flash dryer is based upon the maximum output of the polymerization zone. The flash dryer comprises an elongated tube or a pipe between about 0.25 and about 2 inches preferably between about 0.5 and 1.25 inches in diameter and between about 20 and about 100 feet in length.

In order to more clearly illustrate the present invention, its use will be described with reference to particular operating conditions, although it is believed quite obvious that dimensional changes in equipment and quantitative and qualitative changes in material input and output may be made based on the data given herein. The dehalogenation reactor which is described herein, is made of a 90 foot length of 1 inch pipe positioned as an angular downward sloping unit so that gravity will assist a velocity of from 2 to 6 feet per second to carry the zinc powder through the line. The reactor is situated in a temperature controlled bath which is maintained at about 100° C.

Using this size reactor the fresh feed consists of:

| Material: | Pounds/hour |
| --- | --- |
| Freon 113 | 274 |
| Zinc | 192 |
| Methanol | 500 |

In order to get 100% conversion of the Freon 113 to monomer et al. a considerable excess of zinc, about 10%, must be available, and to provide this condition zinc is recycled from the product separator to the reactor heater as a slurry suspension in a liquid mixture of zinc chloride and methanol. An excess, about 5%, of monomer is preferably added to make up for losses. Methanol is added as required. In order to maintain the desired velocity, one-tenth of the total hourly quantity of reactants and the total quantity of methonal are passed through the reactor in one pass. Ten passes per hour making up the required hourly input and output. The feed per pass consists of:

| Material: | Pounds/pass |
| --- | --- |
| Freon 113 | 27.4 |
| Zinc | 19.2 |
| Methanol | 50.0 |

From the reactor the mixture flows to the separator-settler tower where the monomer product about 163 pounds plus a small fraction of methanol is flashed overhead. A conventional overhead reflux system serves to control the quantity of methanol in the overhead stream. The liquid slurry bottoms from the separator section flows into the settler section where the unreacted zinc settles in more concentrated slurry with liquid zinc chloride and methanol and is pumped therefrom as recycle to the reactor heater. To control the concentration of zinc chloride in the circulating stream a portion mixed with methanol is withdrawn as a decanted liquid from the top of the settler. The methanol is recovered from the zinc chloride in equipment not shown and the latter may be disposed of as such or further treated to recover zinc. There are minor quantities of side reaction products, about 1 pound, in the product and recycle streams which are considered in the recovery and purification equipment described above. The temperature control throughout the system is such that the zinc chloride is held in the liquid phase. Substantially pure monomer is accumulated in accumulator 72.

Polymerization of the accumulated monomer, in this instance, is effected in a polymerization reactor which comprises a 1¼ inch standard pipe approximately 16,540 feet long, arranged in a helix or coil approximately 31 feet in diameter. The coils are so disposed that the velocity of the reactants in the polymerization reactor is between about 0.3 foot and about 4 feet per second preferably about 0.8 foot per second. The 163 pounds per hour of produced monomer, is added to about 2600 pounds per hour of recycled monomer in an accumulator 75. 2763 pounds per hour of monomer are passed through the polymerization reactor together with about eight pounds of trichloroacetyl peroxide promoter dissolved in a suitable solvent such as trichloromonofluoromethane which is introduced at at least one point along the polymerization reactor. In this instance, conditions are adjusted so as to effect a 6% conversion of the monomer to polymer. Thus, about 160 pounds per hour of polymer suspended in approximately 2600 pounds per hour of monomer leave the polymerization reactor and are passed to flash dryer 92.

In the process of this example, the flash dryer is a 1 inch pipe approximately 40 feet in length. The monomer-polymer slurry is introduced into the flash dryer at a velocity sufficient to avoid settling. A pressure reduction between the polymerization reactor and the flash dryer controls the flow rate. Temperature of the flash dryer is maintained at about 100° C. by means of low pressure steam. The polymer leaves the flash dryer in the form of a fluidized powder dispersed in monomer vapor, at a velocity of about 200 feet per second and is passed into primary separator 94 where a major portion of the monomer is separated from the polymer and flow overhead through filters to the recycle system.

The polymer product settles out and is maintained by a heat source at a temperature high enough to evaporate any residual monomer. A stripping medium such as nitrogen is used to maintain an efficient stripping velocity in the fluid bed. A recycling stream of coarse ground polymer product is mixed wtih the reactor product in the primary separator to assist in maintaining a particle size distribution suitable for good fluidization in the bottom bed. This quantity of coarse ground polymer may be as much or more than the polymer product i.e. between about 0.5 and about 2 times.

The mixture of powder flows through a control valve from the bottom of the primary settler, is picked up in a stream of nitrogen and carried to the coarse polymer hopper where the fine polymer product is carried overhead in suspension in nitrogen and the coarse polymer with some fines settles out to be recycled to the prinmary separator.

The flash dryer shown in FIGURE 2 of the drawing is similar to that described above, with reference to FIGURE 1 of the drawing. Thus, a one-inch pipe 40 feet long, was maintained at a temperature of about 100° C. by means of low pressure steam. In this example, about 170 pounds per hour of monomer is withdrawn from dechlorination reactor 14 and is purified as described above. The produced monomer together with recycled monomer amounting to about 2680 pounds per hour is passed through conduit 83 to polymerization reaction 82 together wtih about 7.6 pounds per hour of a solution of trichloroacetyl peroxide in trichloromonofluoromethane. About 170 pounds per hour of solid polymer suspended in liquid monomer is withdrawn through conduit 91 passed by means of pump 90 to flash dryer. Separation of the monomer and recovery of the polymer is effected as described wtih reference to FIGURE 1 of the drawing.

Various modifications and alterations of the process of this invention will be apparent to those skilled in the art and may be used without departing from the scope of this invention.

Having thus described my invention, I claim:

1. A process for the production of a solid polymer of trifluorochloroethylene which comprises introducing trifluorotrichloroethane, methanol and finely divided metallic zinc to a preheating zone and preheating to a temperature between about 90° C. and about 180° C., passing said preheated materials from said preheating zone to the upper portion of an elongated tubular dechlorination zone arranged in the form of a helix, being disposed at an angle between about 20° and about 60° from the horizontal and having a length between about 60 feet and about 100 feet and a diameter between about 0.5 and about 1.25 inches, maintaining said dechlorination zone at a temperature below the temperature of said preheating zone and between about 50° C. and about 150° C. and, flowing said materials downwardly through said dechlorination zone at a velocity between about 2 feet and about 6 feet per second in the dechlorination of trifluorotrichloroethane to trifluorochloroethylene, removing from the bottom portion of said dechlorination zone a dechlorination effluent comprising trifluorochloroethylene, methanol and unreacted zinc, passing said dechlorination effluent to a monomer separation zone, withdrawing a liquid bottoms from said monomer separation zone comprising unreacted zinc and methanol, recycling said liquid bottoms to said preheating zone, removing from the upper portion of said monomer separation zone a vaporous effluent comprising trifluorochloroethylene together with impurities formed in said dechlorination zone, removing said impurities from said trifluorochloroethylene in a purification zone, introducing as liquid monomer said trifluorochloroethylene into the upper portion of an elongated tubular polymerization zone disposed at an angle between about 5° and about 15° from the horizontal, having a length between about 10,000 feet and about 20,000 feet and a diameter between about 0.5 inch and about 1.25 inches, said polymerization zone being arranged in the form of a helix, introducing trichloroacetyl peroxide into said polymerization zone, maintaining said polymerization zone at a temperature between about 10° C. and about 75° C. under conditions such that a portion of said liquid monomer is converted to solid polymer the monomer conversion not exceeding 25%, flowing said liquid monomer and said solid polymer downwardly through said polymerization zone at a velocity between about 0.3 foot and about 4 feet per second, withdrawing from the bottom of said polymerization zone a polymerization effluent comprising a mixture of solid polymer and liquid monomer, passing said polymerization effluent to an elongated tubular flash drying zone having a length between about 30 feet and about 80 feet and a diameter between about 0.5 inch and about 1.25 inches, maintaining said flash drying zone at a temperature between about 90° C. and about 120° C. under conditions such that liquid monomer is vaporized, removing from said flash drying zone at a velocity between about 150 and about 250 feet per second an effluent comprising finely divided solid polymer and vaporous monomer, passing said solid polymer and said vaporous monomer to a polymer separation zone, introducing into said polymer separation zone a quantity of relatively coarse solid polymer of trifluorochloroethylene in an amount between about 0.5 and about two times the weight of said finely divided solid polymer for admixture with said finely divided solid polymer and vaporous monomer, removing vaporous monomer from the upper portion of said polymer separation zone, recycling at least a portion of said vapor monomer, thus recovered to said purification zone, removing from the bottom portion of said separation zone a solid polymer of trifluorochloroethylene as a product of the process.

2. A process for the production of a solid polymer of trifluorochloroethylene which comprises introducing liquid trifluorochloroethylene monomer into the upper portion of an elongated tubular polymerization zone disposed at an angle between about 5° and about 15° from the horizontal, having a length between about 10,000 feet and about 20,000 feet and a diameter between about 0.5 inch and about 1.25 inches, said polymerization zone being arranged in the form of a helix, introducing trichloroacetyl peroxide at at least one point along the polymerization zone, maintaining said polymerization zone at a temperature between about 10° C. and about 75° C. under conditions such that a portion of liquid monomer is converted into solid polymer the monomer conversion not exceeding 25%, flowing said liquid monomer and said solid polymer downwardly through said reaction zone at a velocity between about 0.3 foot and about 4 feet per second, withdrawing from the bottom portion of said polymerization zone a polymerization effluent comprising a solid polymer of trifluorochloroethylene as a product of the process.

3. A process for the separation of a solid polymer of trifluorochloroethylene from liquid trifluorochloroethylene monomer which comprises passing a mixture of a solid polymer of trifluorochloroethylene and liquid trifluorochloroethylene monomer to an elongated tubular flash drying zone having a length between about 30 feet and about 80 feet and a diameter between about 0.5 inch and about 1.25 inches, maintaining said flash drying zone at a temperature between about 90° C. and about 120° C. under conditions such that liquid monomer is vaporized, removing from said flash drying zone at a velocity between about 150 feet and about 250 feet per second an effluent comprising finely divided solid polymer and vaporous trifluorochloroethylene monomer, passing said solid polymer and vaporous monomer to a polymer separation zone, introducing into said polymer separation zone a quantity of relatively coarse solid polymer of trifluorochloroethylene in an amount between about 0.5 and about two times the weight of said finely divided solid polymer for admixture with said finely divided solid polymer and vaporous monomer, removing from the bottom portion of said polymer separation zone a solid polymer of trifluorochloroethylene as a product of the process.

4. A process for the production of a solid polymer of trifluorochloroethylene which comprises preheating trifluorotrichloroethane, methanol and finely divided metallic zinc at a temperature between about 75° and about 250° C. in a preheating zone, passing these preheated materials from said preheating zone to the upper portion of an elongated tubular dechlorination zone disposed at an angle between about 5° and about 90° from the horizontal, and having a length between about 30 feet and about 120 feet and a diameter between about 0.25 inch and about 2 inches, maintaining said dechlorination zone at a temperature between about 40° C. and about 175° C., flowing said materials downwardly through said dechlorination zone at a velocity between about 0.5 foot and about 10 feet per second and dechlorinating trifluorotrichloroethane to trifluorochloroethylene, removing from the bottom portion of said dechlorination zone an effluent comprising trifluorochloroethylene, methanol and unreacted zinc, passing said dechlorination effluent to a monomer separation zone withdrawing a liquid bottoms from said monomer separation zone comprising unreacted zinc and methanol, recycling said bottoms to said preheating zone, removing from the upper portion of said monomer separation zone a vaporous effluent comprising trifluorochloroethylene together with impurities formed in said dechlorination zone, removing said impurities from said trifluorochloroethylene in a purification zone, introducing as liquid monomer said trifluorochloroethylene substantially free of impurities into the upper portion of an elongated tubular polymerization zone disposed at an angle between about 1° and about 30° from the horizontal, and having a length between about 5,000 feet and about 25,000 feet and a diameter between about 0.25 inch and about 2 inches, introducing trichloroacetyl peroxide at at least one point along the polymerization zone, maintaining said polymerization zone at a temperature between about −20° C. and about 150° C., under conditions such that a portion of liquid trifluorochloroethylene monomer is converted to a solid polymer the monomer conversion not exceeding 25%, flowing said liquid monomer and solid polymer downwardly through said polymerization zone at a velocity between about 0.1 foot and about 5 feet per second, withdrawing from the bottom portion of said polymerization zone a polymerization effluent comprising a mixture of solid polymer and liquid monomer, passing said effluent to an elongated tubular flash drying zone having a length between about 20 feet and about 100 feet and a diameter between about 0.25 inch and about 2 inches, maintaining said flash drying zone at a temperature between about 60° C. and about 250° C. under conditions such that liquid trifluorochloroethylene monomer is vaporized, removing from said flash drying zone at a velocity between about 100 feet and about 300 feet per second an effluent comprising a finely divided solid polymer of trifluorochloroethylene and vaporous trifluorochloroethylene monomer, passing said effluent from said flash drying zone to a polymer separation zone introducing into said polymer separation zone a quantity of relatively coarse solid polymer of trifluorochloroethylene for admixture with said finely divided solid polymer and vaporous monomer, removing from the upper portion of said separation zone vaporous trifluorochloroethylene monomer, recycling at least a portion of said vaporous monomer thus recovered to said purification zone, removing from the bottom portion of said separation zone a solid polymer of trifluorochloroethylene as a product of the process.

5. A process for the production of a solid polymer of trifluorochloroethylene which comprises introducing liquid trifluorochloroethylene monomer into the upper portion of an elongated tubular polymerization zone disposed at an angle between about 1° and about 30° from the horizontal, and having a length between about 5,000 feet and about 25,000 feet and a diameter between about 0.25 and about 2 inches, introducing trichloroacetyl peroxide at at least one point along the polymerization zone, maintaining said polymerization at a temperature between about −20° C. and about 150° C. under conditions such that a portion of trifluorochloroethylene is converted to a solid polymer the monomer conversion not exceeding 25%, flowing said liquid trifluorochloroethylene and said solid polymer downwardly through said polymerization zone at a velocity between about 0.1 foot and about 5 feet per second, withdrawing from the bottom portion of said polymerization zone a polymerization effluent comprising a solid polymer of trifluorochloroethylene as a product of the process.

6. A process for separating a mixture of a solid polymer of trifluorochloroethylene and liquid trifluorochloroethylene monomer which comprises passing a mixture of a solid polymer of trifluorochloroethylene and liquid trifluorochloroethylene monomer to an elongated tubular flash drying zone having a length between about 20 feet and about 100 feet and a diameter between about 0.25 inch and about 2 inches maintaining said flash drying zone at a temperature between about 60° C. and about 250° C. under conditions such that liquid trifluorochloroethylene is vaporized, removing from said flash drying zone at a velocity between about 100 feet and about 300 feet per second an effluent comprising finely divided solid polymer of trifluorochloroethylene and vaporous trifluorochloroethylene monomer, passing said effluent from said flash drying zone to a polymer separation zone, introducing into said polymer separation zone a quantity of relatively coarse solid polymer of trifluorochloroethylene in admixture with said finely divided solid polymer and vaporous monomer, removing from the bottom portion of said separation zone a solid polymer of trifluorochloroethylene as a product of the process.

7. A process for the production of a solid polymer of trifluorochloroethylene which comprises introducing trifluorotrichloroethane, a suitable solvent and a finely divided metallic dehalogenating agent to a preheating zone in which they are preheated to a temperature between about 75° C. and about 250° C., passing these preheated materials from said preheating zone to an elongated angularly disposed tubular dechlorination zone having a length of at least 30 feet and a diameter of at least 0.25 inch, maintaining said dechlorination zone at a temperature between about 0° C. and about 200° C. under conditions such that trifluorotrichloroethane is dechlorinated to trifluorochloroethylene, flowing said materials through said dechlorination zone at a velocity of at least 0.1 foot per second, removing from said dechlorination zone a dechlorination effluent comprising trifluorochloroethylene, solvent and unreacted dechlorinating agent, passing said dechlorination effluent to a monomer separation zone, withdrawing a liquid bottoms from said monomer separation zone comprising solvent and dehalogenating agent, recycling at least a portion of said liquid bottoms to said preheating zone, removing from the upper portion of said monomer separation zone a vaporous effluent comprising trifluorochloroethylene together with impurities formed in said dechlorination zone, removing said impurities from said trifluorochloroethylene in a purification zone, introducing as liquid monomer said trifluorochloroethylene into an elongated angularly disposed tubular polymerization zone having a length of at least 5,000 feet and a diameter of at least about 0.25 inch, introducing a halogenated acyl peroxide promoter at at least one point along the polymerization zone maintaining said polymerization zone at a temperature between about −20° C. and about 150° C. under conditions such that a portion of said liquid monomer is converted to a solid polymer the monomer conversion not exceeding 25%, flowing said liquid monomer and said solid polymer through said polymerization zone at a velocity of at least 0.1 foot per second, withdrawing from said polymerization zone a polymerization effluent comprising a mixture of said solid polymer and liquid monomer, passing said polymerization effluent to an elongated tubular flash drying zone having a length of at least about 20 feet and a diameter of at least about 0.25 inch, maintaining said flash drying zone at a temperature between about 60° C. and about 250° C. under conditions such that liquid monomer is vaporized, removing from said flash drying zone at a velocity of at least 50 feet per second an effluent comprising a finely divided solid polymer and vaporous trifluorochloroethylene monomer, passing said solid polymer and said vaporous monomer to a polymer separation zone, removing from the upper portion of said polymer separation zone a vaporous effluent comprising said vaporous monomer, recycling said vaporous effluent to said purification zone, removing from the bottom portion of said polymer separation zone a solid polymer of trifluorochloroethylene as a product of the process.

8. A process for the production of a solid polymer of trifluorochloroethylene which comprises introducing liquid trifluorochloroethylene in an elongated angularly disposed tubular polymerization zone having a length of at least 5,000 feet and a diameter of at least 0.25 inch introducing a halogenated acyl peroxide promoter at at least one point along the polymerization zone, maintaining said polymerization zone at a temperature between about −20° C. and about 150° C. under conditions such that a portion of said liquid monomer is converted to solid polymer the monomer conversion not exceeding 25%, flowing said liquid monomer and said solid polymer through said polymerization zone at a velocity of at least 0.1 foot per second, withdrawing from said polymerization zone a polymerization effluent comprising a solid polymer of trifluorochloroethylene as a product of the process.

9. A process for separating a mixture of a solid polymer of trifluorochloroethylene and liquid trifluorochloroethylene monomer which comprises introducing a mixture of a solid polymer of trifluorochloroethylene and liquid trifluorochloroethylene monomer into an elongated tubular flash drying zone having a length of at least 20 feet and a diameter of at least 0.25 inch, maintaining said drying zone at a temperature between about 60° C. and about 250° C. under conditions such that liquid monomer is vaporized, removing from said flash drying zone at a velocity of at least 50 feet per second an effluent comprising a finely divided solid polymer and vaporous monomer, passing said solid polymer and said vaporous monomer to a separation zone, removing from the upper portion of said ceparation zone a vaporous effluent comprising said vaporous monomer and removing from the bottom portion of said polymer separation zone a solid polymer of trifluorochloroethylene as a product of the process.

10. A process for the production of a solid perfluorochloroolefin polymer which comprises introducing as reactants a perfluorochloroparaffin having from 2 to 4 carbon atoms, containing at least three chlorine atoms and at least one chlorine atom on each of two adjoining carbon atoms and a finely divided metallic dehalogenating agent to an elongated tubular dechlorination zone having a length of at least 30 feet and a diameter of at least 0.25 inch, flowing said reactants through said dechlorination zone at a velocity of at least about 0.1 foot per second under conditions such that said perfluorochloroparaffin is dechlorinated to the corresponding perfluorochloroolefin, removing said perfluorochloroolefin from said dechlorination zone, introducing as liquid monomer said perfluorochloroolefin into an elongated angularly disposed tubular polymerization zone having a length of at least 5,000 feet and a diameter of at least 0.25 inch under conditions such that a portion of said liquid perfluorochloroolefin monomer is converted to a solid polymer the monomer conversion not exceeding 25%, flowing said liquid monomer and said solid polymer through said polymerization zone at a velocity of at least 0.1 foot per second, withdrawing a polymerization effluent from said polymerization zone comprising a mixture of solid polymer and liquid monomer, passing said polymerization effluent to an elongated tubular flash drying zone having a length of at least about 20 feet and a diameter of at least about 0.25 inch maintaining said flash drying zone under conditions such that said liquid monomer is volatilized, removing from said flash drying zone an effluent comprising solid polymer and vaporous monomer, passing said solid polymer and said vaporous monomer to a polymer separation zone, removing from the upper portion of said polymer separation zone an effluent comprising vaporous monomer, recycling said vaporous monomer to said polymerization zone, removing from the bottom portion of said polymer separation zone a solid perfluorochloroolefin polymer as a product of the process.

11. A process for the production of a solid perfluorochloroolefin polymer which comprises introducing a liquid perfluorochloroolefin monomer having from 2 to 4 carbon atoms into an elongated angularly disposed tubular polymerization zone having a length of at least about 5,000 feet and a diameter of at least about 0.25 inch under conditions such that a portion of said liquid perfluorochloroolefin monomer is converted to solid polymer the monomer conversion not exceeding 25%, flowing said liquid monomer and said solid polymer through said reaction zone at a velocity of at least about 0.1 foot per second and withdrawing from said polymerization zone a solid perfluorochloroolefin polymer as a product of the process.

12. A process for the separation of a solid perfluorochloroolefin polymer from liquid perfluorochloroolefin monomer which comprises passing a mixture of a solid perfluorochloroolefin polymer and liquid perfluorochloroolefin monomer having from 2 to 4 carbon atoms to an elongated tubular flash drying zone having a length of at least about 20 feet and a diameter of at least about 0.25 inch under conditions such that said liquid monomer is volatilized, removing from said flash drying zone at a velocity of at least 50 feet per second and effluent comprising said solid polymer and vaporous perfluorochloroolefin monomer, passing said solid polymer and said vaporous monomer to a polymer separation zone, removing from the bottom portion of said polymer separation zone a solid perfluorochloroolefin polymer as a product of the process.

References Cited in the file of this patent

UNITED STATES PATENTS

| | | |
|---|---|---|
| 1,022,338 | Silberrad | Apr. 2, 1912 |
| 2,384,298 | Green | Sept. 4, 1945 |
| 2,579,437 | Miller | Dec. 18, 1951 |
| 2,587,562 | Wilson | Feb. 26, 1952 |
| 2,712,476 | Happel | July 5, 1955 |
| 2,739,960 | Dittman | Mar. 27, 1956 |
| 2,742,454 | Rearick et al. | Apr. 17, 1956 |
| 2,743,303 | Anderson | Apr. 24, 1956 |
| 2,745,885 | Ruh | May 15, 1956 |

UNITED STATES PATENT OFFICE

CERTIFICATION OF CORRECTION

Patent No. 3,014,015                        December 19, 1961

Joseph Warren Jewell

It is hereby certified that error appears in the above numbered patent requiring correction and that the said Letters Patent should read as corrected below.

Column 8, line 49, for "50.0" read -- 500 --; column 14, line 5, for "ceparation" read -- separation --.

Signed and sealed this 24th day of April 1962.

(SEAL)
Attest:

ESTON G. JOHNSON
Attesting Officer

DAVID L. LADD
Commissioner of Patents